(12) United States Patent
Fulton et al.

(10) Patent No.: US 8,844,955 B2
(45) Date of Patent: Sep. 30, 2014

(54) AXLE MOUNT FOR HEAVY-DUTY VEHICLE BRAKE SYSTEM COMPONENTS

(71) Applicant: Hendrickson USA, L.L.C., Itasca, IL (US)

(72) Inventors: R. Scott Fulton, Hudson, OH (US); Phillippi R. Pierce, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 14/033,817

(22) Filed: Sep. 23, 2013

(65) Prior Publication Data

US 2014/0147194 A1 May 29, 2014

Related U.S. Application Data

(60) Provisional application No. 61/730,125, filed on Nov. 27, 2012.

(51) Int. Cl.
 *B60G 9/00* (2006.01)
 *B60T 17/00* (2006.01)

(52) U.S. Cl.
 CPC ...................................... *B60T 17/00* (2013.01)
 USPC ................... 280/124.116; 248/73; 248/205.1; 280/124.117

(58) Field of Classification Search
 USPC .................... 280/124.116, 124.117, 124.156, 280/124.175; 301/124.1; 248/73, 205.1
 See application file for complete search history.

(56) References Cited

U.S. PATENT DOCUMENTS

| 3,445,914 | A | * | 5/1969 | Altgelt | 228/119 |
| 3,465,545 | A | * | 9/1969 | Stamm | 464/179 |
| 4,363,387 | A | * | 12/1982 | Roberts | 188/333 |
| 5,409,415 | A | * | 4/1995 | Kawanami et al. | 451/39 |
| 6,658,907 | B2 | * | 12/2003 | Inoue et al. | 72/53 |
| 6,926,122 | B2 | | 8/2005 | Wittlinger et al. | |
| 2011/0221156 | A1 | * | 9/2011 | Muckelrath et al. | 280/124.117 |

FOREIGN PATENT DOCUMENTS

| EP | 1334848 B1 | 1/2003 |
| EP | 1561827 A1 | 10/2005 |
| JP | 04322894 A * | 11/1992 |
| JP | 3327300 B2 * | 9/2002 |

* cited by examiner

*Primary Examiner* — Faye M Fleming
*Assistant Examiner* — Darlene P Condra
(74) *Attorney, Agent, or Firm* — Dureska, Kennedy & Moore, L.L.C.; David P. Dureska; Brent L. Moore

(57) ABSTRACT

An axle mount for a brake system component of an axle/suspension system includes a weld disposed on and between the axle of the axle/suspension system and a brake system component. The weld secures the brake system component to the axle of the axle/suspension system to form a bracket-to-axle connection. The connection includes a peened portion that is formed by working the surface of the connection by mechanical means. The peened portion of the connection exhibits residual compressive stresses that increase the durability of the brake bracket-to-axle connection and also the durability of the axle itself.

10 Claims, 3 Drawing Sheets

AXLE MOUNT FOR HEAVY-DUTY VEHICLE BRAKE SYSTEM COMPONENTS

CROSS-REFERENCE TO RELATED APPLICATION

This application claims the benefit of U.S. Provisional Patent Application Ser. No. 61/730,125, filed Nov. 27, 2012.

BACKGROUND OF THE INVENTION

1. Field of the Invention

The invention relates generally to brake systems for wheeled vehicles. More particularly, the invention is directed to the brake component mounting brackets that are connected to the axle of the vehicle. More specifically, the invention is directed to a heavy-duty vehicle brake system component axle mount for trucks and tractor-trailers, in which the mounting brackets for the brake system components are securely and efficiently connected to the axle by a peened connection. The peened connection imparts desirable compressive stresses to critical high stress areas of the mounting bracket-to-axle connection, thereby increasing durability of the bracket-to-axle connection as well as durability of the axle. The improved durability of the bracket-to-axle connection and improved durability of the axle provides the opportunity, if desired, to use a thinner, and therefore lighter, axle, which in turn can potentially provide cost and weight savings to the axle/suspension system.

2. Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. For the purpose of convenience and clarity, reference herein will be made to beams, with the understanding that such reference is by way of example, and that the present invention applies to heavy-duty vehicle air-ride axle/suspension systems that utilize rigid-type beams or spring-type beams, and also to heavy-duty vehicle mechanical axle/suspension systems, such as non-air-ride leaf spring systems. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members which form the frame of the vehicle. More specifically, each beam is pivotally connected at one of its ends to a hanger, which in turn is attached to and depends from a respective one of the main members of the vehicle. The beams of the axle/suspension system can either be an overslung/top-mount configuration or an underslung/bottom-mount configuration. For the purposes of convenience and clarity, hereinafter a beam having an overslung/top-mount configuration will be referred to as an overslung beam with the understanding that such reference is by way of example, and that the present invention applies to both overslung/top-mount configurations and underslung/bottom-mount configurations. An axle extends transversely between and typically is connected by some means to the beams of the pair of suspension assemblies at a selected location from about the mid-point of each beam to the end of the beam opposite from its pivotal connection end. The opposite end of each beam also is connected to a bellows air spring or its equivalent, which in turn is connected to a respective one of the main members. A height control valve is mounted on the frame and is operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle. One or more shock absorbers and a brake assembly also are mounted on the axle/suspension system.

Conventional heavy-duty vehicle brake systems typically include a brake assembly for each suspension assembly and its associated wheel. The brake assembly components typically include a brake chamber, a piston, a slack adjuster, and an S-cam assembly. The S-cam assembly includes a cam shaft and an S-cam which is utilized to move brake shoes against a brake drum of the vehicle wheel to decelerate the vehicle. The cam shaft typically is supported at each of its ends. More particularly, the outboard end of the cam shaft is supported by a brake spider which in turn is mounted on the axle. The inboard end of the cam shaft is supported by a cam shaft bracket. The brake spider and the cam shaft bracket each support a bearing to enable rotation of the cam shaft during operation of the vehicle. In certain applications the cam shaft bracket is welded directly to the axle, which provides stability to the inboard end of the cam shaft and its bearing, and in turn to the entire brake assembly. The brake chamber is also mounted on the axle via a brake chamber bracket, which also, in certain applications, is welded directly to the axle.

More specifically, the welding of the brake chamber bracket and the cam shaft bracket directly to the axle can potentially create significant stress risers and local mechanical property changes in the axle, as is generally well known in the art. These stress risers and local mechanical property changes in the axle can in turn potentially reduce the durability/life expectancy of the axle and the bracket-to-axle connection. This reduction in durability/life expectancy can be counteracted by providing a thicker walled axle, but this adds both weight and cost to the axle.

The brake system component axle mount of the present invention overcomes the aforementioned potential problems associated with axle/suspension systems that utilize prior art brake chamber brackets and cam shaft brackets, by providing a peened connection between each of the brackets and the axle, which imparts desirable compressive stresses to critical high stress areas of the mounting bracket-to-axle connection, thereby increasing durability of the bracket-to-axle connection as well as durability of the axle. The resulting improved durability of the bracket-to-axle connection and the axle provides the opportunity if desired to use a thinner, and therefore lighter, axle, which in turn can potentially provide cost and weight savings to the axle/suspension system.

SUMMARY OF THE INVENTION

Objectives of the present invention include providing an axle mount for heavy-duty vehicle brake system components that imparts desirable compressive stresses to critical high stress areas of the mounting bracket-to-axle connection.

A further objective of the present invention is to provide an axle mount for heavy duty vehicle brake system components that increases durability of the bracket-to-axle connection.

Yet another objective of the present invention is to provide an axle mount for heavy-duty vehicle brake system components that increases durability of the axle.

Still another objective of the present invention is to provide an axle mount for heavy-duty vehicle brake system components that provides the opportunity to utilize a thinner, and therefore lighter, axle.

Another objective of the present invention is to provide an axle mount for heavy-duty vehicle brake system components that provides cost and weight savings to the axle/suspension system.

These objectives and advantages are obtained by the axle mount for a brake system component of an axle/suspension system comprising: a weld disposed on and between an axle of the axle/suspension system and a brake system component, the weld securing the brake system component to the axle to form a bracket-to-axle connection, the connection including a peened portion.

BRIEF DESCRIPTION OF THE SEVERAL VIEWS OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
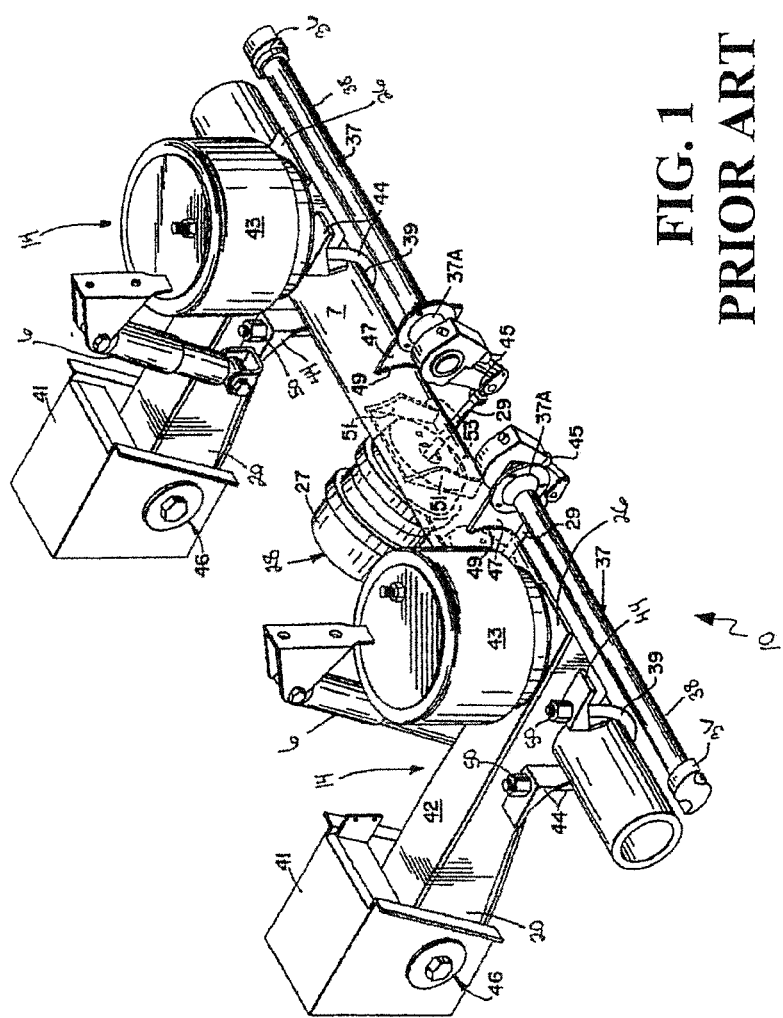
FIG. 1 is a driver side rear perspective view of an axle/suspension system utilizing prior art brake chamber brackets and cam shaft brackets welded directly to the axle utilizing untreated welds, with hidden portions represented by broken lines.

In order to provide a better understanding of the operating environment in which the improved axle mount for brake system components is utilized, a prior art trailing arm overslung beam-type air-ride axle/suspension system for heavy-duty vehicles is indicated generally at 10, is shown in FIG. 1, and now will be described.

Because axle/suspension system 10 includes a pair of suspension assemblies 14 that generally mirror one another, for sake of clarity, only one of the suspension assemblies will be described below.

Suspension assembly 14 is pivotally connected to a hanger 41 via a trailing arm overslung beam 42. More specifically, trailing arm beam 42 includes a front end 20 having a bushing assembly 46, which includes a bushing, pivot bolts and washers, as are well known in the art, to facilitate pivotal connection of the front end of the beam to hanger 41. Beam 42 also includes a rear end 26, which is rigidly attached to a transversely-extending axle 7, having a standard wall thickness of about 0.50 inches to about 1.0 inches, via a pair of U-bolts 39 (only one shown) that are disposed around the axle and fastened, via nuts 50, to U-bolt brackets 44, which in turn are mounted on beam 42.

Suspension assembly 14 also includes an air spring 43 mounted on and extending between rear end 26 of beam 42 and a main member (not shown) of the vehicle. A shock absorber 6 is mounted on and extends between beam 42 and the main member (not shown) in a manner well known in the art. For the sake of relative completeness, a brake assembly 28 is shown mounted on prior art suspension assembly 14.

More particularly, brake assembly 28 includes a brake chamber 27, a piston 29, a slack adjuster 45, and an S-cam assembly 37. S-cam assembly 37 includes an S-cam 36 attached to the outboard end of a transversely extending cam shaft 38. Cam shaft 38 is supported at each of its ends. More particularly, the outboard end of cam shaft 38 is supported by a brake spider and a bearing (not shown). The inboard end of cam shaft 38 is supported by a cam shaft bracket 47 having a bearing 37A mounted thereon. Cam shaft 38 thus is rotatably mounted in the brake spider bearing and the cam shaft bracket bearing 37A, for moving brake shoes (not shown) against a brake drum of the respective vehicle wheel (not shown) to decelerate the vehicle during operation. Cam shaft bracket 47 is attached directly to axle 7 via untreated welds 49 and provides stability to the inboard end of S-cam assembly 37, which in turn provides stability to brake assembly 28. Brake chamber 27 is mounted on axle 7 via a brake chamber bracket 51, which is similarly welded directly to the axle via untreated welds 53.

The welding of brake chamber bracket 51 and cam shaft bracket 47 directly to axle 7 utilizing untreated welds can potentially create significant stress risers and local mechanical property changes in the axle, as is generally well known in the art. These stress risers and local mechanical property changes in axle 7 can in turn potentially reduce the life expectancy and durability of the axle, thereby requiring the use of a thicker walled axle to counteract the effects of the stress concentrations.

Figure 2:
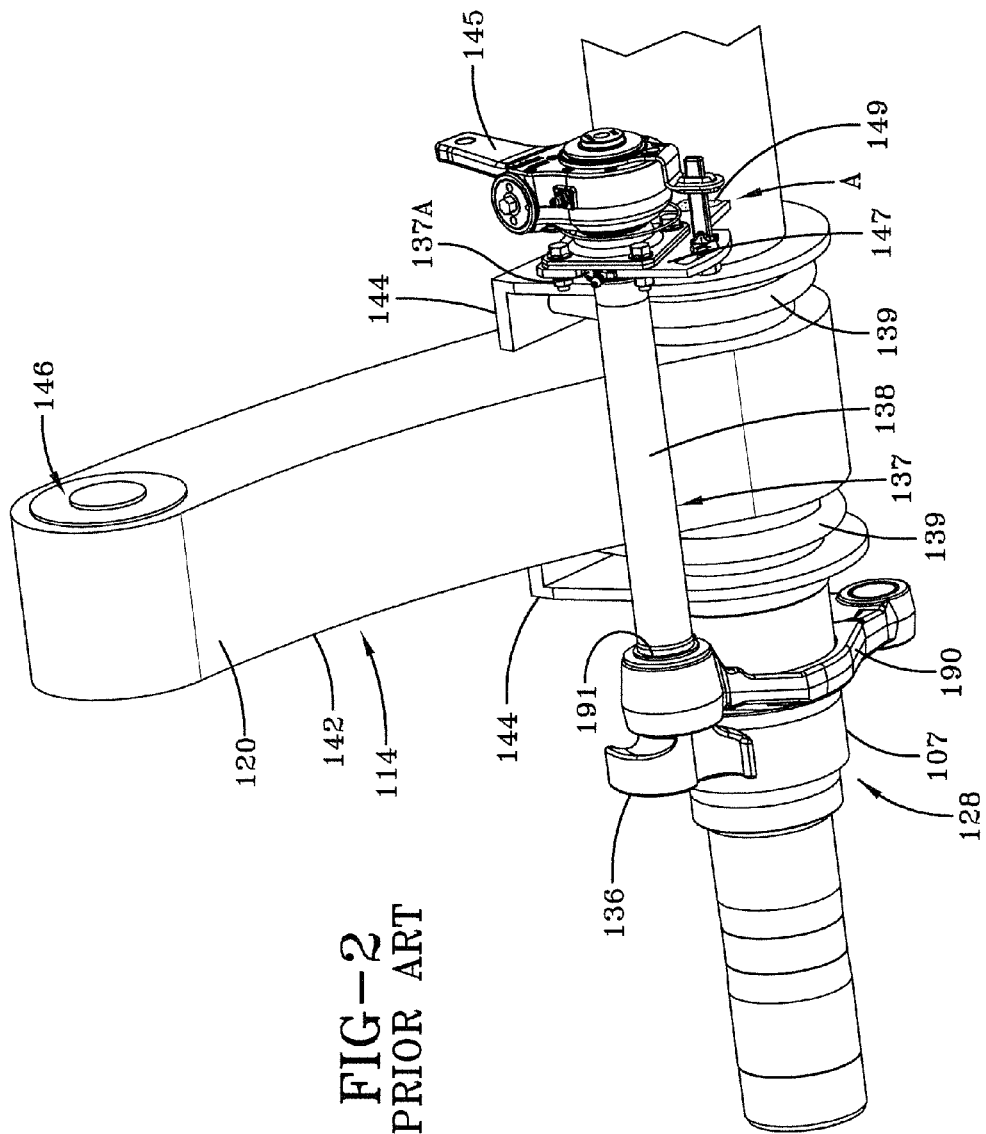
FIG. 2 is a front perspective view of a curb side overslung suspension assembly, showing a stress concentration on the axle adjacent to and above the prior art cam shaft bracket-to-axle connection that utilizes untreated welds.

Turning now to FIG. 2, an overslung curb side suspension assembly 114 is shown with the hanger, the air spring, the shock absorber and the brake chamber removed. Overslung suspension assembly 114 is similar in many respects to overslung suspension assembly 14 described above, but is different in other respects. More particularly, suspension assembly 114 includes a trailing arm overslung beam 142. Trailing arm beam 142 includes a front end 120 having a bushing assembly 146, which includes a bushing, pivot bolts and washers, as are well known in the art, to facilitate pivotal connection of the front end of the beam to the hanger (not shown). Beam 142 also includes a rear end (not shown), which is rigidly attached to a transversely-extending axle 107, having a standard wall thickness, via a pair of U-bolts 139 that are disposed around the axle and fastened, via nuts (not shown), to U-bolt brackets 144, which in turn are mounted on beam 142.

Suspension assembly 114 also includes an air spring (not shown) mounted on and extending between the rear end of beam 142 and a main member (not shown) of the vehicle. Portions of a brake assembly 128 are shown mounted on prior art suspension assembly 114.

More particularly, selected components of brake assembly 128 include a slack adjuster 145, and a cam shaft assembly 137. Cam shaft assembly 137 includes an S-cam 136 attached to the outboard end of a transversely extending cam shaft 138. Cam shaft 138 is supported at each of its ends. More particularly, the outboard end of cam shaft 138 is supported by a brake spider 190 and a bearing 191. The inboard end of cam shaft 138 is supported by a cam shaft bracket 147 having a bearing 137A mounted thereon. Cam shaft 138 thus is rotatably mounted in brake spider bearing 191 and the cam shaft bracket bearing 137A, for moving brake shoes (not shown) against a brake drum of the respective vehicle wheel (not shown) to decelerate the vehicle during operation. Cam shaft bracket 147 is attached directly to axle 107 via untreated welds 149 and provides stability to the inboard end of S-cam assembly 137, which in turn provides stability to brake assembly 128. The brake chamber (not shown) is mounted on axle 107 via a brake chamber bracket (not shown), which is similarly welded directly to the axle via untreated welds (not shown).

The welding of the brake chamber bracket and cam shaft bracket 147 directly to axle 107 utilizing untreated welds can potentially create significant stress risers and local mechanical property changes in the axle and the welds of the bracket-to-axle connection, as shown at stress concentration A in FIG. 2, which typically manifests as cracks in the weld which can potentially propagate into the axle. These stress concentrations in the untreated welds and axle 107 can in turn potentially reduce the life expectancy and durability of the axle and the bracket-to-axle connection. These potential issues are solved by the axle mount for heavy-duty vehicle brake system components of the present invention, which is described in detail below.

Figure 3:
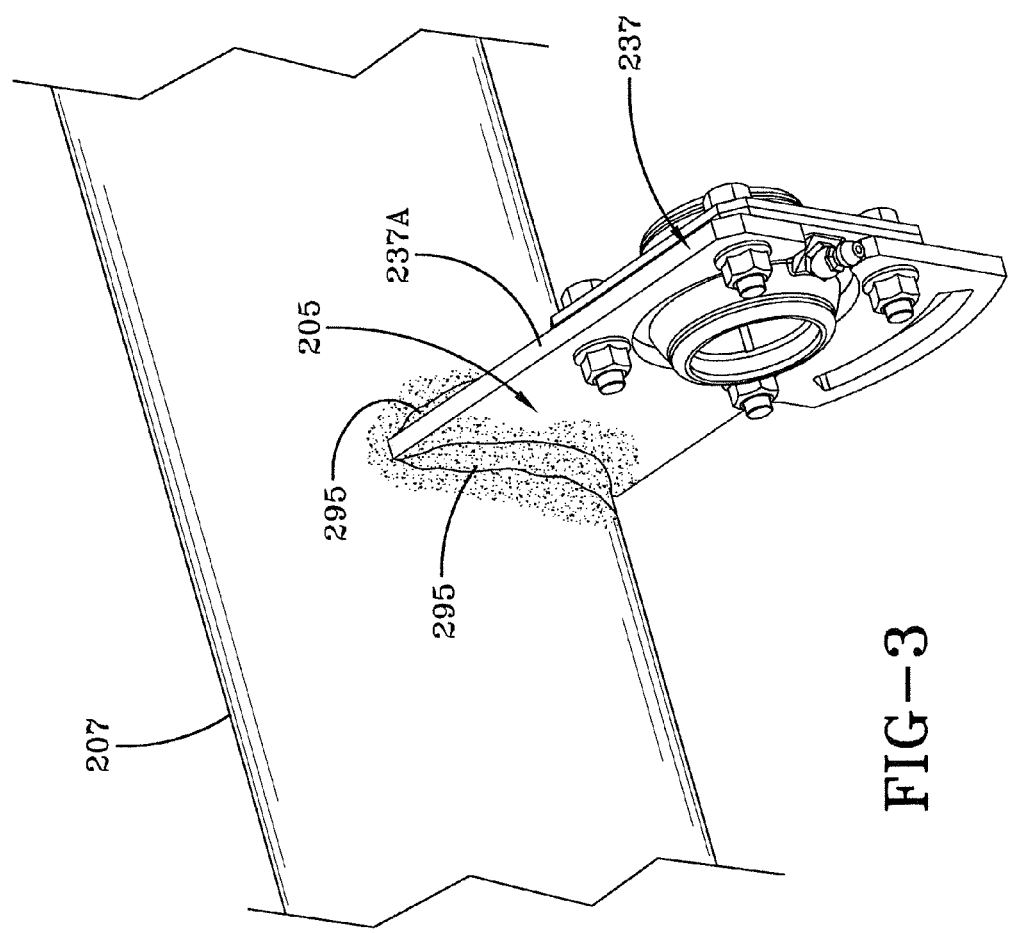
FIG. 3 is a greatly enlarged front perspective view of the axle mount for brake system components of the present invention, showing the peened connection of the cam shaft bracket to the axle of the axle/suspension system.

A preferred embodiment axle mount for brake system components of the present invention is shown generally at 205 in FIG. 3, incorporated on an axle 207 having a standard wall thickness, for use in a heavy-duty vehicle trailing arm air-ride overslung/underslung beam-type axle/suspension system, described in detail above, and which includes a pair of brake assemblies (only a portion of one shown), with differences being described below. It is understood that preferred embodiment axle mount for brake system components 205 could also be utilized with an axle having a thickness of less than about 0.50 inches, without changing the overall concept or operation of the present invention. Preferred embodiment axle mount for brake system components 205 of the present invention will be described in connection with a brake assembly (only selected components shown) which includes a cam shaft assembly 237 that utilizes a cam bushing bracket 237A. It should be understood that preferred embodiment axle mount for brake system components 205 could also be utilized with other types of brake assemblies, such as one utilizing the cam shaft support/enclosure assembly shown and described in U.S. Pat. No. 6,240,806 or the cam tube bracket shown and described in U.S. Pat. No. 7,537,224, both of which are owned by the assignee of the instant application, or other brake assemblies that typically mount brake system components on an axle using welds, or the like, without changing the overall concept or operation of the present invention.

The inboard end of the cam shaft (not shown) is disposed through cam bushing bracket 237A, which is immovably mounted on axle 207 via first preferred embodiment axle mount for brake components 205 of the present invention, as will be described in detail below. Cam bushing bracket 237A, in conjunction with preferred embodiment axle mount for brake components 205, stabilizes the inboard end of the cam shaft (not shown).

In accordance with one of the primary features of the present invention, preferred embodiment axle mount for brake components 205 of the present invention includes a peened bracket-to-axle connection that includes a peened weld 295 that extends along each of the inboard and outboard surfaces of cam bushing bracket 237A and generally adjacent the front quadrant of axle 207 at the interface of the bracket surfaces and the axle. Peened weld 295 is peened along its entire length. In addition, the bracket-to-axle connection is peened a sufficient distance beyond the weld to axle interface and the weld to bracket interface, beyond the boundary of where the stress concentration exists, to increase desirable compressive stresses. The peening of the bracket-to-axle connection is accomplished by working the surface of weld 295, bracket 237A and axle 207 by mechanical means, such as hammer blows or by blasting with shot and is performed as a cold work process, expanding the surface of the cold metal, and thereby inducing compressive stresses or relieving tensile stresses already present in the weld, bracket and/or axle. More particularly, the plastic deformation of the peened bracket-to-axle connection induces a residual compressive stress state in the peened weld surface and the surrounding surfaces of bracket 237A and axle 207. These surface compressive stresses confer resistance to metal fatigue in the peened connection because cracks will typically not propagate through a compressive stress environment on the weld or adjacent bracket and/or axle. The peened bracket-to-axle connection has been described in conjunction with cam bushing bracket 237A, but could also be utilized in conjunction with the brake chamber bracket or other brake components or brackets that are welded directly to the axle, without changing the overall concept or operation of the present invention.

Axle mount for brake system components 205 of the present invention overcomes the types of potential issues associated with prior art brake mounts which, because they utilize untreated welds 49,149 applied directly to axles 7,107, respectively, potentially create significant stress risers and local mechanical property changes in the bracket-to-axle connection and the axle. These stress risers and local mechanical property changes can in turn potentially reduce the durability and life expectancy of welds 49,149 as well as axles 7,107.

Improved axle mount for brake components 205 of the present invention imparts desirable compressive stresses into the critical high stress areas of the bracket-to-axle connection, thereby increasing durability of the bracket-to-axle connection as well as durability of axle 207. The improved durability of the bracket-to-axle connection and axle 207 provides the opportunity if desired to use a thinner, and therefore lighter, axle, which in turn provides cost and weight savings to the axle/suspension system.

It is contemplated that preferred embodiment axle mount for brake system components 205 of the present invention could be utilized on trucks, tractor-trailers or other heavy-duty vehicles having one or more than one axle, such as two or more axles, without changing the overall concept or operation of the present invention. It is further contemplated that preferred embodiment axle mount for brake system components 205 of the present invention could be utilized in connection with vehicles having frames or subframes which are moveable or non-movable without changing the overall concept of the present invention. It is yet even further contemplated that preferred embodiment axle mount for brake system components 205 of the present invention could be utilized on all types of air-ride leading and/or trailing arm beam-type axle/suspension system designs known to those skilled in the art without changing the overall concept or operation of the present invention. For example, the present invention finds application in connection with axle/suspension systems having beams or arms that are made of materials other than steel, such as aluminum, other metals, metal alloys, composites, and/or combinations thereof. It is also contemplated that preferred embodiment axle mount for brake system components 205 of the present invention could be utilized in connection with axle/suspension systems having either an overslung/top-mount configuration or an underslung/bottom-mount configuration, without changing the overall concept of the present invention. The present invention also finds application in connection with axle/suspension systems having beams or arms with different designs and/or configurations than that shown and described herein, such as solid beams, shell-type beams, truss structures, intersecting plates, spring beams and parallel plates. It is yet even further contemplated that preferred embodiment axle mount for brake system components 205 of the present invention could be utilized in conjunction with axles having varied wall thicknesses, different shapes, and being formed or constructed from different materials, without changing the overall concept or operation of the present invention. It is also contemplated that preferred embodiment axle mount for brake system components 205 of the present invention could be utilized in conjunction with many types of air-ride rigid beam-type axle/suspension systems, including those using U-bolts, U-bolt brackets/axle seats and the like, without changing the overall concept or operation of the present invention. It is even further contemplated that preferred embodiment axle mount for brake system components 205 of the present invention could be utilized in connection with other types of axle/suspension systems, such as mid-lift, trailer four-spring or tandem axle/suspension systems or those that utilize leaf springs, without changing the overall concept or operation of the present invention. It is also contemplated that preferred embodiment axle mount for brake system components 205 of the present invention could be utilized in connection with all types of brake systems, without changing the overall concept or operation of the present invention. It is contemplated that preferred embodiment axle mount for brake system components 205 of the present invention could be utilized in conjunction with other types of brackets having different shapes and sizes, without changing the overall concept or operation of the present invention.

Accordingly, the axle mount for heavy-duty vehicle brake system components is simplified, provides an effective, safe, inexpensive and efficient structure and method which achieves all the enumerated objectives, provides for eliminating difficulties encountered with prior art axle mounts for heavy-duty vehicle brake system components, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the axle mount for heavy-duty vehicle brake system components is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An axle mount for a brake system component of an axle/suspension system comprising:
a weld disposed on and between an axle of said axle/suspension system and a brake system component, said weld securing said brake system component to said axle inboard of a suspension assembly of said axle/suspension system, to form a bracket-to-axle connection, said connection including a peened portion.

2. The axle mount for a brake system component of an axle/suspension system of claim 1, wherein said peened portion of said connection extends an entire length of said weld and onto adjacent surfaces of said axle or said bracket.

3. The axle mount for a brake system component of an axle/suspension system of claim 1, wherein said peened portion of said connection extends an entire width of said weld and onto adjacent surfaces of said axle or said bracket.

4. The axle mount for a brake system component of an axle/suspension system of claim 1, wherein said axle includes a thickness of less than 0.50 inches.

5. The axle mount for a brake system component of an axle/suspension system of claim 1, wherein said axle includes a thickness of 0.50 inches or greater.

6. The axle mount for a brake system component of an axle/suspension system of claim 1, wherein said brake system component is chosen from the group consisting of a brake chamber bracket and a cam bushing bracket.

7. The axle mount for a brake system component of an axle/suspension system of claim 1, wherein said peened portion of said connection is accomplished by working a surface of said connection by mechanical means.

8. The axle mount for a brake system component of an axle/suspension system of claim 7, wherein said mechanical means is selected from the group consisting of hammer blows and blasting with shot.

9. The axle mount for a brake system component of an axle/suspension system of claim 7, wherein said mechanical means is performed as a cold work process.

10. The axle mount for a brake system component of an axle/suspension system of claim 1, whereby said peened portion of said connection exhibits a compressive stress state.

* * * * *